(12) United States Patent
Morita et al.

(10) Patent No.: US 8,893,498 B2
(45) Date of Patent: Nov. 25, 2014

(54) METHOD OF POWER GENERATION BY WASTE COMBUSTION AND WASTE COMBUSTION SYSTEM

(75) Inventors: Minoru Morita, Kodaira (JP); Jun Hidari, Tokyo (JP); Yoshinobu Sato, Tokyo (JP); Mai Matsuda, Tokyo (JP)

(73) Assignee: Tsukishima Kankyo Engineering Ltd., Tokyo (JP)

( * ) Notice: Subject to any disclaimer, the term of this patent is extended or adjusted under 35 U.S.C. 154(b) by 650 days.

(21) Appl. No.: 13/121,131

(22) PCT Filed: Nov. 6, 2009

(86) PCT No.: PCT/JP2009/068979
§ 371 (c)(1),
(2), (4) Date: May 9, 2011

(87) PCT Pub. No.: WO2010/103692
PCT Pub. Date: Sep. 16, 2010

(65) Prior Publication Data
US 2011/0209478 A1 Sep. 1, 2011

(30) Foreign Application Priority Data

Mar. 11, 2009 (JP) .................................. 2009-057453

(51) Int. Cl.
*F01K 13/00* (2006.01)
*F23J 15/02* (2006.01)
(Continued)

(52) U.S. Cl.
CPC ........ *B01D 53/501* (2013.01); *B01D 2252/204* (2013.01); *F23J 15/02* (2013.01);
(Continued)

(58) Field of Classification Search
USPC .................. 60/645–670, 671, 39.12; 423/235, 423/242.1, 173
See application file for complete search history.

(56) References Cited

U.S. PATENT DOCUMENTS

| 3,456,709 A | * | 7/1969 | Vegeby | ........................ 159/4.02 |
| 3,638,708 A | * | 2/1972 | Farin | ............................ 159/47.3 |

(Continued)

FOREIGN PATENT DOCUMENTS

| CN | 1185563 A | 6/1998 |
| JP | 52 052486 A | 4/1977 |

(Continued)

OTHER PUBLICATIONS

International Search Report for International Appl. No. PCT/JP2009/068979 dated Feb. 9, 2010; 4 pages.

*Primary Examiner* — Thomas Denion
*Assistant Examiner* — Shafiq Mian
(74) *Attorney, Agent, or Firm* — Renner Kenner; Arthur M. Reginelli

(57) ABSTRACT

[Problem] To provide a waste combustion method enabling to utilize efficiently heat energy of a large amount of a wet gas generated from a high temperature gas, which is discharged from a waste combustion furnace so as to be cooled and washed
[Means for Solving Problem] A method of power generation by waste combustion comprising supplying the waste into a combustion furnace 1 for combustion, feeding a combustion gas from the combustion furnace 1 into a quenching vessel 4 containing a cooling/dissolving water and bringing the combustion exhaust gas into direct contact with the cooling/dissolving water and thus generating a wet gas wherein this wet gas G is supplied directly into a power generation system 10 employing a working medium, or a heat recovery medium, which has been exchanged with the wet gas G, is supplied into the power generation system 10, so that the power generation system is operated.

6 Claims, 8 Drawing Sheets

(51) Int. Cl.
   *B01D 53/50* (2006.01)
   *B01D 53/62* (2006.01)
   *F01K 23/06* (2006.01)
   *F01K 25/10* (2006.01)
   *F01K 3/18* (2006.01)
   *F23G 5/46* (2006.01)
   *B01D 53/77* (2006.01)

(52) U.S. Cl.
   CPC ..... *B01D 2251/402* (2013.01); *B01D 2257/504* (2013.01); *Y02E 20/12* (2013.01); *B01D 53/62* (2013.01); *F01K 23/064* (2013.01); *F01K 13/00* (2013.01); *B01D 2258/0291* (2013.01); *Y02C 10/04* (2013.01); *F01K 25/10* (2013.01); *B01D 53/77* (2013.01); *F01K 3/188* (2013.01); *F23G 5/46* (2013.01); *B01D 2251/80* (2013.01)
   USPC .......................................................... 60/645

(56) References Cited

U.S. PATENT DOCUMENTS

| | | | | | |
|---|---|---|---|---|---|
| 3,817,724 | A | * | 6/1974 | Ellis | 48/209 |
| 3,859,174 | A | * | 1/1975 | Taylor | 203/10 |
| 4,150,953 | A | * | 4/1979 | Woodmansee | 48/71 |
| 4,193,259 | A | * | 3/1980 | Muenger et al. | 60/774 |
| 4,261,167 | A | * | 4/1981 | Paull et al. | 60/781 |
| 4,291,636 | A | * | 9/1981 | Bergsten et al. | 110/346 |
| 4,747,356 | A | * | 5/1988 | Beisswenger et al. | 110/343 |
| 4,958,578 | A | * | 9/1990 | Houser | 110/246 |
| 5,035,188 | A | * | 7/1991 | Johnson et al. | 110/345 |
| 5,041,398 | A | * | 8/1991 | Kauser et al. | 501/27 |
| 5,050,375 | A | * | 9/1991 | Dickinson | 60/39.12 |
| 5,117,623 | A | * | 6/1992 | Arundale | 60/775 |
| 5,421,166 | A | * | 6/1995 | Allam et al. | 62/649 |
| 5,509,264 | A | * | 4/1996 | Ito et al. | 60/39.12 |
| 5,540,896 | A | * | 7/1996 | Newby | 422/172 |
| 5,681,158 | A | * | 10/1997 | Knapp | 431/5 |
| 5,964,921 | A | * | 10/1999 | Uitvlugt | 95/13 |
| 6,032,467 | A | * | 3/2000 | Oshita et al. | 60/651 |
| 6,058,856 | A | * | 5/2000 | Okusawa et al. | 110/233 |
| 6,063,355 | A | * | 5/2000 | Fujimura et al. | 423/359 |
| 6,298,666 | B1 | * | 10/2001 | Miyoshi et al. | 60/670 |
| 6,536,215 | B1 | * | 3/2003 | Vikstrom | 60/641.1 |
| 7,128,005 | B2 | * | 10/2006 | Carter et al. | 110/233 |
| 7,763,219 | B2 | * | 7/2010 | Mason | 422/198 |
| 8,080,089 | B1 | * | 12/2011 | Wen et al. | 95/166 |
| 8,375,725 | B2 | * | 2/2013 | Keller et al. | 60/780 |
| 2002/0190442 | A1 | * | 12/2002 | Gross | 266/81 |
| 2003/0221432 | A1 | * | 12/2003 | Tucker | 60/781 |
| 2009/0148371 | A1 | * | 6/2009 | Reddy et al. | 423/235 |
| 2011/0139003 | A1 | * | 6/2011 | Joh et al. | 95/183 |

FOREIGN PATENT DOCUMENTS

| | | | | |
|---|---|---|---|---|
| JP | 52-052486 A | | 4/1977 | |
| JP | 58 079583 | | 5/1983 | |
| JP | 58-0795836 A | | 5/1983 | |
| JP | 06 129212 A | | 5/1994 | |
| JP | 06-129212 | | 10/1994 | |
| JP | 07-251161 | | 3/1995 | |
| JP | 07 251161 A | | 10/1995 | |
| JP | 08 094050 A | | 4/1996 | |
| JP | 08 193505 A | | 7/1996 | |
| JP | 08 261600 A | | 10/1996 | |
| JP | 08-261600 | | 11/1996 | |
| JP | 10-317918 | | 12/1998 | |
| JP | 10 317918 A | | 12/1998 | |
| JP | 11 264528 A | | 9/1999 | |
| JP | 2002 233731 A | | 8/2002 | |
| JP | 2002-233862 | | 8/2002 | |
| JP | 2002 233862 A | | 8/2002 | |
| JP | 2003 190741 A | | 7/2003 | |
| JP | 2003-222320 | | 8/2003 | |
| JP | 2003 222320 A | | 8/2003 | |
| JP | 2003222320 A | * | 8/2003 | 60/670 |
| JP | 2003227605 A | * | 8/2003 | 60/670 |
| JP | 2003232511 A | * | 8/2003 | 60/670 |
| JP | 2003240219 A | * | 8/2003 | 60/670 |
| JP | 2005 098552 A | | 4/2005 | |
| JP | 2006 027942 A | | 2/2006 | |

* cited by examiner

METHOD OF POWER GENERATION BY WASTE COMBUSTION AND WASTE COMBUSTION SYSTEM

TECHNICAL FIELD

The present invention relates to a waste combustion method, in particular a liquid waste combustion method, and a waste combustion system, and the present invention relates to, for example, a waste combustion method and a waste combustion system for detoxification of a waste containing organic matters and hazardous substances that are not allowed to be discharged directly.

The present invention further relates to a method of power generation by waste combustion, particularly by a liquid waste combustion, comprising supplying it into a combustion furnace, feeding a combustion gas from the combustion furnace into a quenching vessel containing a cooling/dissolving water and bringing the combustion gas into direct contact with the cooling/dissolving water and thus using a heat of a wet gas caused by the direct contact between the combustion gas and cooling/dissolving water and the present invention also relates to waste combustion system for the method of power generation by waste combustion.

BACKGROUND ART

Liquid waste, i.e., wastewater, which contains mainly water and organic and inorganic materials as the remainder, has been generated in all industrial fields including petrochemical industry and also in consumer product fields. Liquid waste containing for example organic matters or hazardous substances, which cannot be discharged out directly, should be subjected to a detoxification treatment. Out of detoxification treatments, high temperature oxidation, i.e., an incineration treatment, where a wastewater is combusted at a high temperature by feeding it into a combustion furnace (burning furnace), has been known and used frequently, because a large amount of wastewater can be treated. A gaseous waste, i.e., waste gas, is also treated alone or together with the wastewater in a similar manner.

As disclosed in Patent Document 1, the applicant had proposed, in a combustion method for processing such a waste, to elongate the lifetime of a refractory lined to an internal wall of a combustion furnace by circulating a heat transfer medium such as dibenzyl toluene or polymeric oil in an external wall region of the furnace so that the temperature of the medium and the temperature of an internal surface of the furnace are controlled. Precisely, in the combustion method, the external wall region of the furnace has a jacket structure allowing the circulation of the heat transfer medium described above. Then, by controlling the temperature of the heat transfer medium to cool the internal wall of the furnace, the surface temperature of the internal wall can be adjusted within an appropriate range. By doing so, fused alkali salts derived from alkali components in the waste can be coated so as to form a self-protecting film on the surface of the refractory lined to the internal wall of the furnace. Thus, corrosion of the refractory lined there is prevented so as to elongate the lifetime of the refractory.

The heat transfer medium supplied to the combustion furnace cools the refractory lined on the internal wall of the furnace so as to control the surface temperature of the refractory as described above. Due to such cooling, the heat transfer medium itself is heated and fed back from the combustion furnace. Then, the heated heat transfer medium is cooled during a flow in a circulation route to the combustion furnace to which thus cooled heat transfer medium is supplied again. In this connection, effective utilization of recovered energy of the heat transfer medium is important, because of high temperature of the heat transfer medium when it is fed back from the combustion furnace.

In the conventional combustion methods, as mentioned above, a compound as the heat transfer medium is dibenzyl toluene, polymeric oil and the like. So, it is difficult to take out such compound from a combustion system for utilization of energy, thereby its application is limited. Accordingly, even if the high temperature heat transfer medium fed back from the combustion furnace is totally or partially taken out from the flow in the above circulation route within the combustion system, the taken heat transfer medium can be merely used, for example, for heat exchange with a cooling water or directly as a heat source for evaporative concentration of the waste supplied to the combustion furnace.

Then, as disclosed in Patent Document 2, the applicant proposed a combustion method and a combustion apparatus for a waste that can utilize energy generated by waste combustion more directly and efficiently for multiple purposes. In the combustion method and the combustion apparatus, a combustion furnace is cooled by supplying cooling water to an external wall of a waste combustion furnace and a heated cooling water generated by this cooling is recovered in the form of a vapor such as steam for a boiler, resulting in reliably ensured effectiveness.

Alternatively, Patent Document 3 proposes, in feeding a combustion exhaust gas from a combustion furnace into a quenching vessel containing a cooling/dissolving water and bringing the combustion exhaust gas into direct contact with the cooling/dissolving water, energy of a wet gas caused by the direct contact can be utilized effectively in combination with an absorption heat pump.

CITATION LIST

Patent Documents

Patent Document 1: JP 3394085
Patent Document 2: JP 2003-222320 A
Patent Document 3: JP 8-261600 A

DISCLOSURE OF THE INVENTION

Technical Problem to be Solved

As described above, in conventional methods and systems, the utilization of energy has not reached a sufficient level while the utilization of the vapor has been only individual.

The inventors have focused on the fact that the amount of the heat quantity (energy) generated during the waste combustion is enormous. After the heat transfer medium such as a cooling water is supplied to the external surface of the combustion furnace, the heat transfer medium is heated while the wet gas is caused by the direct contact between the combustion exhaust gas and the cooling/dissolving water. Then, the inventors intend to utilize efficiently the energy of the heated heat transfer medium as well as the energy of the wet gas for power generation, because they think that this efficient utilization of the energy contributes to reduction of $CO_2$ generation and energy saving.

Therefore, a major object of the present invention is to provide an efficient waste combustion method and a waste combustion system that allow effective utilization of heat generated in waste combustion for power generation in order to attain reliably energy saving.

Means to Solve the Problems

Embodiments of the Invention
reside in a waste combustion method comprising:
supplying a waste into a combustion furnace;
feeding a combustion exhaust gas from the combustion furnace into a quenching vessel containing a cooling/dissolving water;
bringing the combustion exhaust gas into direct contact with the cooling/dissolving water; and
thus using directly or indirectly a heat of a wet gas caused by the direct contact between the combustion exhaust gas and the cooling/dissolving water as a heat source for a power generation system employing a working medium.
(Effect and Operation)
By feeding a combustion exhaust gas from a combustion furnace into a quenching vessel containing a cooling/dissolving water and bringing the combustion exhaust gas into direct contact with the cooling/dissolving water, a saturated wet gas (the wet gas) is caused by the direct contact. Then, the inventors considered intensively as to whether or not it is possible, with this wet gas used as a heat source for a power generation system employing a working medium, i.e., in a so-called Rankine cycle, to generate power by driving an expansion turbine. Then, the inventors have found that effective power generation can be attained.

There is a method where a wet gas is supplied to a vaporizer directly. Alternatively, there is another method where heat exchange between a wet gas and another heat recovery medium (such as a water) is carried out for supplying the heat recovery medium into a vaporizer. In both the methods, the power generation can be carried out efficiently.

Embodiments of the Invention
reside in a waste combustion method, characterized in that:
in a waste combustion system for combusting a waste by supplying it into a combustion furnace, feeding a combustion exhaust gas from the combustion furnace into a quenching vessel containing a cooling/dissolving water and thus bringing the combustion exhaust gas into direct contact with the cooling/dissolving water,
a circulating system employing an organic working medium is installed so as to extend through a vaporizer, an expansion turbine and a generator, a condenser, and a booster pump in that order and additionally a heat exchanger is installed between an intermediate between the expansion turbine and the condenser and an intermediate between the booster pump and the vaporizer; and
a wet gas caused by the direct contact between the combustion exhaust gas and the cooling/dissolving water is used as a heat source for the vaporizer.

Embodiments of the Invention
reside in-a waste combustion method, characterized in that:
in a waste combustion system for combusting a waste by supplying it into a combustion furnace, feeding a combustion exhaust gas from the combustion furnace into a quenching vessel containing a cooling/dissolving water and thus bringing the combustion exhaust gas into direct contact with the cooling/dissolving water,
a circulating system employing an organic working medium is installed so as to extend through a vaporizer, a heating device, an expansion turbine and a generator, a condenser, and a booster pump in that order and additionally a heat exchanger is installed between an intermediate between the expansion turbine and the condenser and an intermediate between the booster pump and the vaporizer;
a wet gas caused by the direct contact between the combustion exhaust gas and the cooling/dissolving water is used as a heat source for the vaporizer; and
a heat transfer medium is circulated inside an external wall of the combustion furnace to enable to protect a wall of the combustion furnace so that a heat of the heat transfer medium after circulation is used as a heat source for the heating device.
(Effect and Operation of the Inventions According to Claims 2 and 3)

In the inventions according to Claims 2 and 3, utilizing the heat of the wet gas, the organic working medium is heated in the vaporizer so as to drive the expansion, resulting in power generation.

Here, the wet gas shows a change in heat quantity with change in temperature significantly different from that of Rankine cycle that is operated by a general water-steam system. The change in temperature of wet gas is shown in FIG. 8. FIG. 8 shows the change in heat quantity with change in temperature at a decomposition temperature of 950° C. and a quenching vessel outlet pressure of 0.113 MPa, which is a typical waste combustion condition, and a vertical axis therein shows temperature, while a horizontal axis shows heat quantity per hour.

Precisely, the change in heat quantity with change in temperature of the heated gas of a water-steam system is almost uniform (showing mostly uniform change in release of heat quantity). On the other hand, in the case of wet gas, as indicated by the curve of "change in wet gas-heat quantity" shown in FIG. 8, although the wet gas starts condensation of steam with decrease of temperature, heat quantity tends to change slowly so as to maintain the high level until the temperature is decreased to about 80° C. and since then, the heat quantity is rapidly released.

In the case of Rankine cycle in which the working medium is heated in a vaporizer (heat exchanger) by using the heated gas, because it is necessary to maintain a certain temperature difference with respect to the change in heat quantity with change in temperature of the heated gas, a vaporization should be performed under a condition indicated by the line of "heated gas-vaporizer (1)" in FIG. 8.

On the other hand, in the case of Rankine cycle in which the working medium is heated in a vaporizer (heat exchanger) by using the wet gas, heat quantity changes slowly so as to maintain the high level until the temperature is decreased to about 80° C. Accordingly, it is possible to maintain a certain temperature difference with respect to the change in heat quantity with change in temperature of the wet gas so as to set vaporization carried out under a condition indicated by the line of "wet gas-vaporizer (2)" in FIG. 8. Thus, the preheating required for Rankine cycle when it is supplied from the condenser to the vaporizer can be performed at a change rate similar to that in a region of the curve of the "change in wet gas-heat quantity" where the temperature is decreased rapidly. It is possible, after the preheating, to heat the working medium for vaporization in the vaporizer, with the high level of heat quantity required for the vaporization and with the wet gas, the temperature difference to be required can be ensured.

As obvious from the description above, according to the method of the present invention, about 70 to 80% of the entire available heat quantity can be released due to a temperature decrease of about 15° C. in an initial phase of the wet gas condensation and such released heat quantity can be used for the vaporization of the working medium. After this, rapid decrease of the temperature can be used for preheating the working medium. Thus, almost perfect heat recovery can be attained. Therefore, the heat of the wet gas can be utilized for heating the working medium so efficiently.

Because the vaporization pressure of the working medium is low, the effective enthalpy drop in the expansion turbine is not large. However, the power generated by the expansion turbine is significantly governed by the amount of the working medium vaporized. The temperature of the wet gas according to the present invention is not so high of about 86° C. to 92° C. for temperature applied in such operation (the temperature of the wet gas may be called "lower temperature"). Nonetheless, the wet gas is higher in volume than the combustion exhaust gas when they have substantially the same weight resulting in a large amount of a heat quantity of the wet gas as latent heat. Therefore, it is possible to vaporize the working medium in a great amount and to increase the power generated by the expansion turbine.

On the other hand, the cooling water is circulated inside the external wall of the waste combustion furnace so that the heated cooling water generated by this cooling can be recovered in the form of a vapor having the temperature of about 95° C. to 100° C. (hereinafter, it is also called "heated waste steam". The heated waste steam has a temperature that can be called as "medium temperature"). However, the amount of the heated waste steam is small of about 10 to 15% of the wet gas. Even if the heated waste steam is small in amount, as indicated by "wet gas-heating device (3)" in FIG. 8, the heated waste steam can be recovered effectively for the temperature increase of the working fluid.

Embodiments of the Invention reside in a waste combustion method, characterized in that:

in a waste combustion system for combusting a waste by supplying it into a combustion furnace, feeding a combustion exhaust gas from the combustion furnace into a quenching vessel containing a cooling/dissolving water and thus bringing the combustion exhaust gas into direct contact with the cooling/dissolving water, a first circulating system employing a multi-component working medium is installed so as to extend through a vaporizer, a separation unit for gas liquid separation of a vapor vaporized in the vaporizer, an expansion turbine and a generator, a condenser and a booster pump in that order;

a second circulating system is installed so as to combine a low-concentration working medium separated in the separation unit and a turbine exhaust gas at between the expansion turbine and the condenser;

a heat exchanger is additionally installed between the second circulating system and an intermediate between the booster pump and the vaporizer; and a wet gas caused by the direct contact between the combustion exhaust gas and the cooling/dissolving water is used as a heat source for the vaporizer.

Embodiments of the Invention reside in waste combustion method, characterized in that:

in a waste combustion system for combusting a waste by supplying it into a combustion furnace, feeding a combustion exhaust gas from the combustion furnace into a quenching vessel containing a cooling/dissolving water and thus bringing the combustion exhaust gas into direct contact with the cooling/dissolving water, a first circulating system employing a multi-component working medium is installed so as to extend through a vaporizer, a heating device, a separation unit for gas liquid separation of a vapor vaporized in the heating device, an expansion turbine and a generator, a condenser, and a booster pump in that order;

a second circulating system is installed so as to combine a low-concentration working medium separated in the separation unit and a turbine exhaust gas at between the expansion turbine and the condenser;

a heat exchanger is additionally installed between the second circulating system and an intermediate between the booster pump and the vaporizer;

a wet gas caused by the direct contact between the combustion exhaust gas and the cooling/dissolving water is used as a heat source for the vaporizer; and a heat transfer medium is circulated inside an external wall of the combustion furnace to enable to protect a wall of the combustion furnace so that a heat of the heat transfer medium after circulation is used as a heat source for the heating device.

Examples of the working media according to the present invention will be described below, but if the working medium is an organic working medium, the vaporization temperature is a certain predetermined temperature. Thus, it is not possible to raise the power generation efficiency even if the vaporization temperature of the organic working medium is made closer to the inlet temperature of the wet gas.

However, if the working medium is a multi-component medium, for example aqueous ammonia, it is possible to make the vaporization temperature of the multi-component working medium closer to the inlet temperature of the wet gas, because there is some change in the composition of the mixture even during vaporization, similarly to a mixture of an absorbent and a refrigerant. In addition, because the working medium is not completely vaporized at the outlet of the vaporizer, it is possible to reduce the condensation pressure by mixing the dilute solution after vaporization of the refrigerant with the exhaust gas from the expansion turbine and increase the enthalpy drop in the expansion turbine (Lorentz law), which enables to raise the power generation efficiency.

Embodiments of the Invention reside in the waste combustion method according to one or more embodiments of the present invention, wherein the wet gas discharged from the vaporizer is fed to a generator of an absorption heat pump having the generator, a condenser, a vaporizer and an absorber so that the absorption heat pump is operated, thus the vaporizer of the absorption heat pump is functioned also as the condenser of the circulating system employing a working medium.

(Effect and Operation)

As described above, the wet gas is low in temperature, but is high in volume when it is produced. Thus, the heat is still much available, even when some of it is consumed for heating in the vaporizer. Accordingly, unused portion of the heat can be utilized as another heat source (e.g., as the heat source for the boiler) by driving the absorption type heat pump, and if the vaporizer of the absorption heat pump is functioned also as the condenser of the circulating system employing the working medium, the configuration becomes simpler.

Embodiments of the Invention reside in-a waste combustion system for combusting a waste comprising:

supplying means for supplying the waste into a combustion furnace;

feeding means for feeding a combustion exhaust gas from the combustion furnace into a quenching vessel containing a cooling/dissolving water; and bringing means for bringing the combustion exhaust gas into direct contact with the cooling/dissolving water, wherein, a circulating system employing an organic working medium is installed so as to extend through a vaporizer, an expansion turbine and a generator, a condenser, and a booster pump in that order and a heat exchanger is additionally installed between an intermediate between the expansion turbine and the condenser and an intermediate between the booster pump and the vaporizer; and a wet gas caused by the direct contact between the combustion exhaust gas and the cooling/dissolving water is used as a heat source for the vaporizer.

Embodiments of the Invention reside in a waste combustion system for combusting a waste comprising:

supplying means for supplying the waste into a combustion furnace;

feeding means for feeding a combustion exhaust gas from the combustion furnace into a quenching vessel containing a cooling/dissolving water; and bringing means for bringing the combustion exhaust gas into direct contact with the cooling/dissolving water, wherein, a circulating system employing an organic working medium is installed so as to extend through a vaporizer, a heating device, an expansion turbine and a generator, a condenser, and a booster pump in that order and heat exchanger is additionally installed between an intermediate between the expansion turbine and the condenser and an intermediate between the booster pump and the vaporizer;

a wet gas caused by the direct contact between the combustion exhaust gas and the cooling/dissolving water is used as a heat source for the vaporizer; and a heat transfer medium is circulated inside an external wall of the combustion furnace to enable to protect a wall of the combustion furnace so that a heat of the heat transfer medium after circulation is used as a heat source for the heating device.

Embodiments of the Invention reside in a waste combustion system for combusting a waste comprising:

supplying means for supplying the waste into a combustion furnace;

feeding means for feeding a combustion exhaust gas from the combustion furnace into a quenching vessel containing a cooling/dissolving water; and bringing means for bringing the combustion exhaust gas into direct contact with the cooling/dissolving water wherein a first circulating system employing a multi-component working medium is installed so as to extend through a vaporizer, a separation unit for gas liquid separation of a vapor vaporized in the vaporizer, an expansion turbine and a generator, a condenser, and a booster pump in that order;

a second circulating system is installed so as to combine a low-concentration working medium separated in the separation unit and turbine exhaust gas at between the expansion turbine and the condenser;

a heat exchanger is additionally installed between the second circulating system and an intermediate between the booster pump and the vaporizer; and a wet gas caused by direct contact between the combustion exhaust gas and the cooling/dissolving water is used as a heat source for the vaporizer.

Embodiments of the Invention reside in a waste combustion system for combusting a waste comprising:

supplying means for supplying the waste into a combustion furnace;

feeding means for feeding a combustion exhaust gas from the combustion furnace into a quenching vessel containing a cooling/dissolving water; and bringing means for bringing the combustion exhaust gas into direct contact with the cooling/dissolving water, wherein a first circulating system employing a multi-component working medium is installed so as to extend through a vaporizer, a heating device, a separation unit for gas liquid separation of a vapor vaporized in the heating device, an expansion turbine and a generator, a condenser, and a booster pump in that order;

a second circulating system is installed so as to combine a low-concentration working medium separated in the separation unit and turbine exhaust gas at between the expansion turbine and the condenser;

a heat exchanger is installed between the second circulating system and an intermediate between the booster pump and the vaporizer;

a wet gas caused by the direct contact between the combustion exhaust gas and the cooling/dissolving water is used as a heat source for the vaporizer; and a heat transfer medium is circulated inside an external wall of the combustion furnace to enable to protect a wall of the combustion furnace so that a heat of the heat transfer medium after circulation is used as a heat source of the heating device.

Embodiments of the Invention reside in a method of power generation by waste combustion comprising:

supplying the waste into a combustion furnace;

feeding a combustion gas from the combustion furnace into a quenching vessel containing a cooling/dissolving water; and bringing the combustion exhaust gas into direct contact with the cooling/dissolving water, and thus generating a wet gas, wherein the wet gas is supplied into a counter-current heat recovery column having back-pressure means subsequently thereto, an inlet of the wet gas at its lower level, and an inlet for a heat recovery medium to be heated at its upper level so that the wet gas and the heat recovery medium are brought into contact under counter-current flow; and the heat recovery medium heated therein is supplied to a power generation system employing a working medium so that the power generation system is operated.

(Effect and Operation)

According to the present invention, in the counter-current heat recovery column having back-pressure means subsequently thereto, the wet gas and the heat recovery medium (water) are brought into contact under counter-current flow. That is to say, under high pressure, water in the wet gas is condensed and the heat recovery medium is heated. After that, heat exchange is performed between the heated heat recovery medium and the working medium with a heat exchanger. Accordingly, such heat exchange can be carried out with a heat transfer coefficient higher than that in the gas-liquid heat exchange and allows reduction in size of the heat exchanger. Further the heat recovery medium can be used reliably as the heat source for the vaporization in the vaporizer in the power generation system. For a heat source for the vaporizer of the working medium, if heat exchange is performed between gas and liquid, for example, a heat exchanger with an evaporator should be used, however, if the heat recovery medium is used, for example, a plate heat exchanger can be used, which improves performance with regard to the heat coefficient, which enables to reduce the size of the heat exchanger with a lower cost.

Embodiments of the Invention reside in the method of power generation by waste combustion according to one or more embodiments of the present invention, wherein the back-pressure means used is a venturi scrubber.

(Effect and Operation)

By using the venturi scrubber as the back-pressure means, the back-pressure means can be functioned also as the dust-removing step required for discharge of the combustion gas into air with a lower cost for the system.

Embodiments of the Invention reside in the method of power generation by waste combustion according to one or more embodiments of the present invention, wherein dusts in the wet gas are removed at between the combustion furnace and the counter-current heat recovery column.

(Effect and Operation)

Such dust removal suppresses contamination of the heat recovery medium, which would be caused from the dust components contained in exhaust gas. In this case, the dust components are not transferred into the heat recovery medium, thereby a scale of the dust components cannot be attached to a heat transfer surface of the heat exchanger. This means that the heat transfer coefficient cannot be lowered.

Embodiments of the Invention reside in a system of power generation by waste combustion, comprising a combustion furnace for combustion of a waste;

wet gas-generating means for feeding a combustion gas from the combustion furnace into a quenching vessel containing a cooling/dissolving liquid, bringing the combustion gas and the cooling/dissolving liquid into direct contact with each other, and thus generating a wet gas;

a counter-current heat recovery column having an inlet of the wet gas at its lower level and an inlet for a heat recovery medium at its upper level so that the wet gas and the heat recovery medium are brought into contact under counter-current flow;

back-pressure means installed subsequently to the counter-current heat recovery; and a power generation system employing a working medium wherein the heat recovery medium heated in the counter-current heat recovery column is supplied to the power generation system for operation thereof.

Embodiments of the Invention reside in the system of power generation by waste combustion according to one or more embodiments of the present invention, wherein the back-pressure means used is a venturi scrubber.

(Effect and Operation)

Embodiments of the Invention reside in the system of power generation by waste combustion according to one or more embodiments of the present invention, further comprising wet gas dust-removing means installed between the combustion furnace and the counter-current heat recovery column.

Embodiments of the Invention reside in the system of power generation by waste combustion according to one or more embodiments of the present invention, wherein the counter-current heat recovery column has upper and lower counter-current contact parts in two stages;

the power generation system has a preheater for the working medium, a vaporizer, an expansion unit equipped with a generator and a condenser, a lower temperature heat recovery medium obtained in the upper counter-current contact part is circulated back to the preheater in a circulating system, and a higher temperature heat recovery medium obtained in the lower counter-current contact part is circulated to the vaporizer in the circulating system.

(Effect and Operation)

The heat recovery medium having a suitable temperature can be supplied to the preheater and the vaporizer in the power generation system, allowing operation at higher heat recovery efficiency.

Embodiments of the Invention reside in the system of power generation by waste combustion according to one or more embodiments of the present invention, wherein the combustion furnace has a cooling channel for flow of a cooling liquid in the furnace wall, and the heat recovery medium, which has been produced by heating in the counter-current heat recovery column as the cooling liquid flows in the cooling channel, is supplied to a heating device installed downstream of the vaporizer for the working medium employed in the power generation system.

(Effect and Operation)

Since the combustion furnace has the cooling channel for flow of the cooling liquid in the furnace wall, the combustion furnace can be cooled and protected. On the other hand, the heated cooling water generated by this cooling can be recovered as the heat recovery medium having the temperature of about 95° C. The amount of the heat quantity of the heat recovery medium fed from the cooling channel in the furnace wall is about 10 to 15% of the wet gas. However, since the heat recovery medium has the high temperature, it can be supplied to the preheater, to the heating device installed downstream of the vaporizer for the working medium as the heating medium so as to be utilized for heating the working medium, which has passed through the vaporizer.

Effect of the Invention

The present invention provides the efficient waste combustion method that enables heat quantity generated by the waste combustion to be utilized effectively for the power generation attaining reliably saving energy and a waste combustion system for the waste combustion method.

BEST MODE FOR CARRYING OUT THE INVENTION (Basic Configuration of Waste Combustion System)

Figure 1:
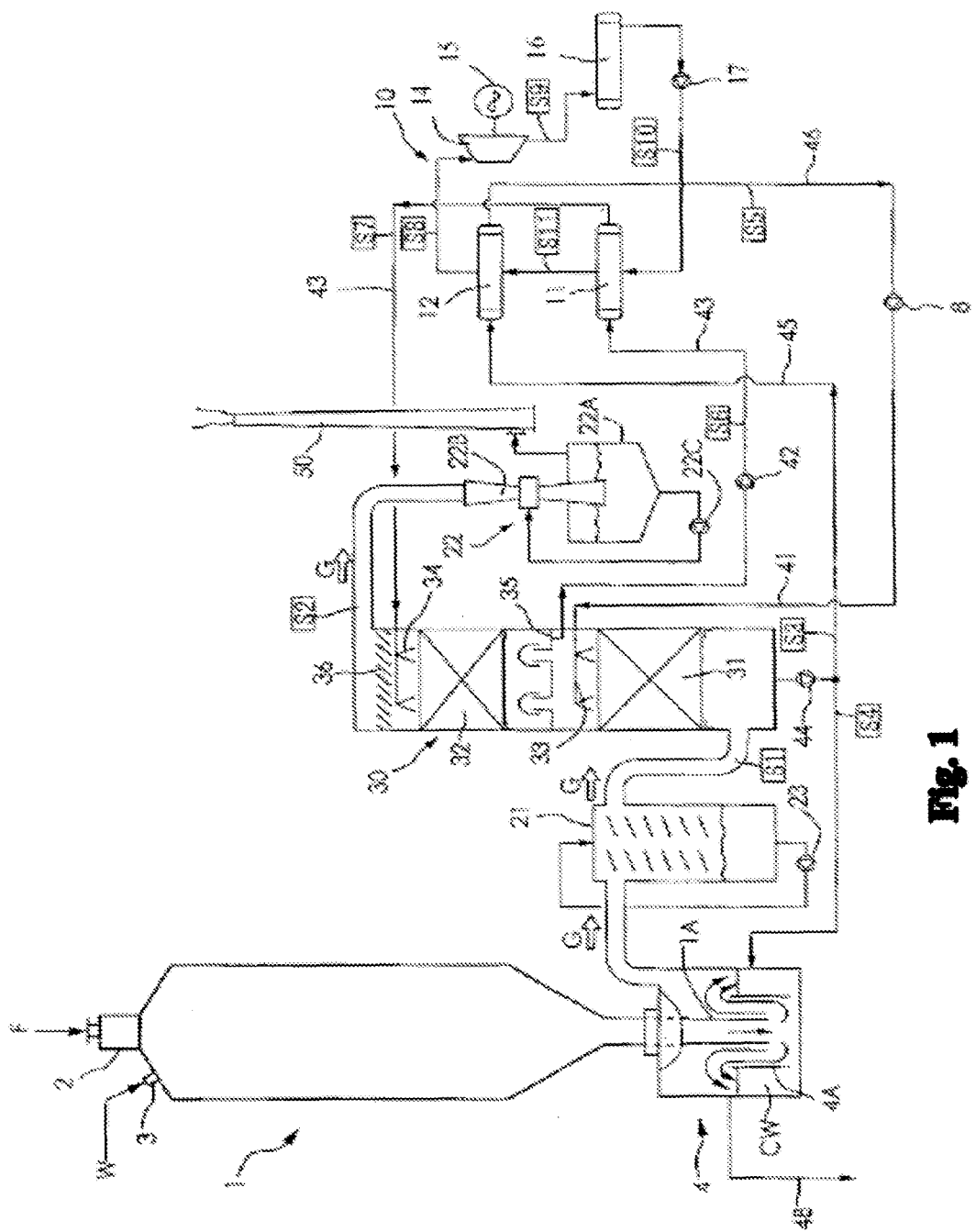
FIG. 1 is a schematic view illustrating a first embodiment of the waste combustion system according to the present invention.

FIG. 1 shows an embodiment of the waste combustion system according to the present invention.

A combustion furnace 1, which is vertical cylinder in shape, has an auxiliary burner (e.g., Voltex burner) 2 on a center of the top thereof. An auxiliary fuel F such as kerosene is fed downward together with a combustion air (not shown in this drawing) from the auxiliary burner 2 into the combustion furnace 1 for combustion, and multiple nozzles 3 (only one nozzle is shown in FIG. 1) for feeding a waste W into the combustion furnace 1 are installed in a shoulder region of the combustion furnace 1 surrounding the auxiliary burner 2 at the same interval in the circumferential direction and at angles downward in the direction toward the center line of the cylindrical combustion furnace 1. The waste W fed through these nozzles 3 into the combustion furnace 1 was combusted by combustion of the auxiliary fuel F of the auxiliary burner 2.

The combustion gas generated by combustion moves to a bottom region of the combustion furnace 1 and is fed through a downcomer 1A of the combustion furnace 1 into a cooling/dissolving vessel 4 containing a cooling/dissolving liquid CW, bringing the combustion gas and the cooling/dissolving liquid CW into contact with each other. A gas liquid mixture vigorously agitated shows dust-collecting function and agitation function. Thus, the most of dust components contained in the exhaust gas and the salts flowing down as fused are captured and dissolved in the mixture, which is discharged out of the apparatus as an alkaline overflow 4B of cooling/dissolving liquid CW for a treatment as desired. In the present case, the cooling/dissolving liquid used is water. However, it is not limited to water, and commonly used coolants (such as aqueous solutions) may be used.

The combustion gas separated from the dissolving liquid (so as to be so-called wet gas G) is used as a heat source for a power generation system, as will be described below.

Besides, a power generation system 10 employing an organic medium as its working medium is installed. The power generation system 10 has a vaporizer 12, a preheater 11 as a preferable apparatus, an expansion turbine 14 and a generator 15, a condenser 16 and a booster pump 17 in that order along a circulating system employing the working medium.

In addition, a heat exchanger 4 may be installed for heat exchange between an intermediate between the expansion turbine 14 and the condenser 16 and an intermediate between the booster pump 17 and the preheater 11.

(Power Generation)

The working medium employed in the power generation system 10 is favorably an organic medium. The following refrigerants can be listed as the organic medium.

(1) HFC (hydrofluorocarbon)-based refrigerants: R23, R32, R125, R134a, R143a, R152a, R227ea, and R245fa
(2) PFC (perfluorocarbon)-based refrigerants: R218
(3) natural refrigerants: R290 (propane), R600 (butane) and R600a (isobutane)

First Embodiment

Now, as the first embodiment, one embodiment of the present invention is described below. After bringing a combustion gas into direct contact with a cooling/dissolving liquid CW, dusts are removed from a wet gas G in a first dust-removing apparatus 21. As the first dust-removing apparatus 21, a venturi scrubber can be used, which can be used similarly as a second dust-removing apparatus 22. Alternatively, as the first dust-removing apparatus, a mistseparator operated as an inertial dust collector can be used, as shown in FIG. 1. A liquid at the bottom of the first dust-removing apparatus 21 is circulated as a spraying liquid by means of a pump 23.

After the first dust-removing, the wet gas G is fed into a counter-current heat recovery column 30 at its lower level. The counter-current heat recovery column 30 has two stages vertically: upper and lower counter-current contact parts. The upper counter-current contact part 32 and the lower counter-current contact part 31 each contain suitable fillers. A heat recovery medium, after passing through a vaporizer 12, is fed through a line 41 by means of a pump 8 to the counter-current heat recovery column 30 so that the introduced heat recovery medium is sprayed downward from a sprinkler 33 provided above the lower counter-current contact part 31.

The heat recovery medium, after passing through a preheater 11, goes through a line 43 by means of a pump 42 to the counter-current heat recovery column 30 so as to be sprayed downward from a sprinkler 34 provided above the upper counter-current contact part 32. A liquid, which has been contacted in the upper counter-current contact part 32, flows down from this part 32 and discharges from e.g., a capped tray 35 so as to be circulated by means of the pump 42 through the line 43. An eliminator 36 is installed in the highest region of the counter-current heat recovery column 30.

The heat recovery medium is not particularly limited as long as it permits heat recovery. As examples, other than water, there are magnesium hydroxide slurry used for absorption of sulfuric acid gas in the combustion exhaust gas, amine solution used for absorption of carbon dioxide gas also in the combustion exhaust gas, and the like. In these cases, the heat recovery column 30 turns to function as an exhaust gas desulphurization column or as an exhaust gas decarboxylation column.

Therefore, the heat recovery medium, after contacting with the wet gas G under counter-current contact in the counter-current heat recovery column 30, flows downward to the bottom of the column 30 from which the heat recovery medium is discharged by means of a pump 44 so as to be sent through a line 45 to the vaporizer 12 where heat exchange is carried out between the heat recovery medium and a working medium. Then, the heat recovery medium is, after the heat exchange in the vaporizer 12, fed through a line 41 by means of a pump 8 to the sprinkler 33.

On the other hand, the wet gas G discharged from the counter-current heat recovery column 30 is sent to, for example, a venturi scrubber as a second dust-removing apparatus 22. The second dust-removing apparatus 22 has a water bath 22A and a venturi tube 22B, which are connected each other. A liquid discharged from the second dust-removing apparatus 22 is circulated thereto by means of a pump 22C. In the second dust-removing apparatus 22, dusts are transferred to water-side. Then, a purified gas is discharged from the second dust-removing apparatus 22 and is released to the atmosphere through a chimney 50 or the like. When a venturi scrubber is used as the second dust-removing apparatus 22, since the venturi scrubber functions also as back-pressure means installed subsequently to the counter-current heat recovery column 30, the wet gas is condensed in the second dust-removing apparatus 22. This allows efficient heat exchange in the counter-current heat recovery column 30. In this case, the venturi scrubber is functioned as the second dust-removing apparatus and also as the back-pressure means. Instead of the venturi scrubber, for example an ejector type dust-collecting apparatus may be used.

The working medium employed in a power generation system 10 is heated by hot water in the preheater 11 and the vaporizer 12, and fed as a high temperature vapor into an expansion turbine 14 for operation of a generator 15. An exhaust gas from the expansion turbine 14 is condensed in a condenser 16 and fed by means of a booster pump 17 into the preheater 11. Before being condensed, the exhaust gas from the expansion turbine is brought into heat exchange by a heat exchanger whereby the temperature of the exhaust gas is decreased resulting in improving efficiency of the expansion turbine 14 and decreasing load applied to the condenser 16.

Second Embodiment

Figure 2:
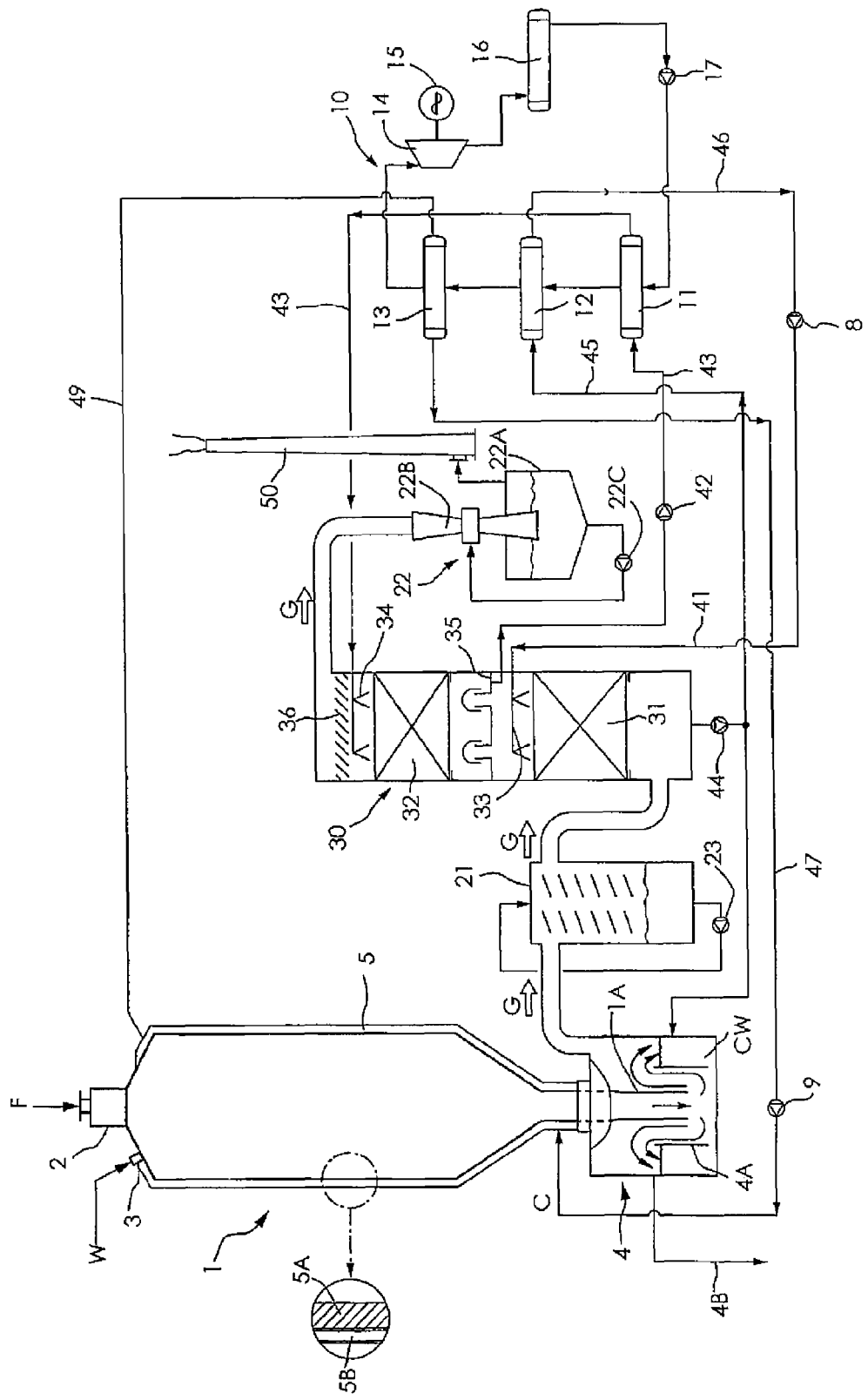
FIG. 2 is a schematic view illustrating a second embodiment of the waste combustion system according to the present invention.

A waste combustion furnace according to the present invention is not limited to the furnace shown in FIG. 1. As shown in FIG. 2, a combustion furnace 1 having an external wall 5 of a double-walled jacket structure may be used in order to utilize efficiently a cooling liquid flowing inside the external wall thereof. The combustion furnace 1 has a refractory material lined to the wall thereof so as to form an internal wall region 5A while the furnace 1 has also a cooling channel extending from the bottom to the top thereof so as to form a space 5B. A cooling liquid C is supplied into the space 5B by means of a pump 9 installed outside the combustion furnace 1. In this embodiment, corrosion of the refractory in the internal wall region 5A is prevented due to cooling of the furnace wall by means of the cooling liquid C, which turns to be heated due to this cooling for the combustion furnace 1, while heat quantity of thus heated cooling liquid C is used for heating a working medium employed in a power generation system. The cooling liquid C for use may be a liquid such as water and oil.

The cooling liquid (heated liquid) C, after being heated in the space 5B, is fed through a line 49 into a heating device 13, where heat exchange is carried out between the heated liquid C and the working medium employed in the power generation system. Then, the cooling liquid discharged from the heating device 13 is fed by means of a pump 9 through a line 47 back into the jacket space 5B of the external wall 5 of the double-walled jacket structure. The heating device 13 is more preferably installed downstream of the preheater 11 and the vaporizer 12. The reason of this is that the heated liquid obtained from the jacket space 5B is higher in temperature than the heat recovery medium obtained from the counter-current heat recovery column 30, and thus, it is possible to heat the working medium employed in the power generation system more efficiently by supplying it into the heating device 13 installed downstream of the vaporizer 12.

Alternatively, the cooling liquid C, after being heated in the space 5B, can be supplied into the vaporizer 12 together with the heat recovery medium obtained from the counter-current heat recovery column 30. Specifically, it is preferable to supply the heated cooling liquid C into a line 45 in order to mix the heated cooling liquid C and the heat recovery medium discharged from the bottom of the counter-current recovery column 30. In this case, it should be noted that the heat recovery medium discharged from the counter-current heat recovery column 30 possibly contains exhaust gas derived dusts and others, which requires dust-removing means or the like on the line 49 and/or the line 47 in order to prevent these dusts and others from entering into the jacket space 5B.

As other embodiments, there are for example a system where a combustion gas is fed into a horizontally installed cylindrical combustion furnace so as to circle in the direction of tangent line and thus the exhaust gas is fed into a quenching vessel (dissolver) in the same way, and alternatively, a system in which an exhaust gas from a vertically installed furnace for fluidized bed combustion is, after being treated in a cyclone for separation of coarsely granular materials from the exhaust gas, fed into a quenching vessel (dissolver) in also the same way.

Third Embodiment

Embodiment According to Claim 2

Figure 3:
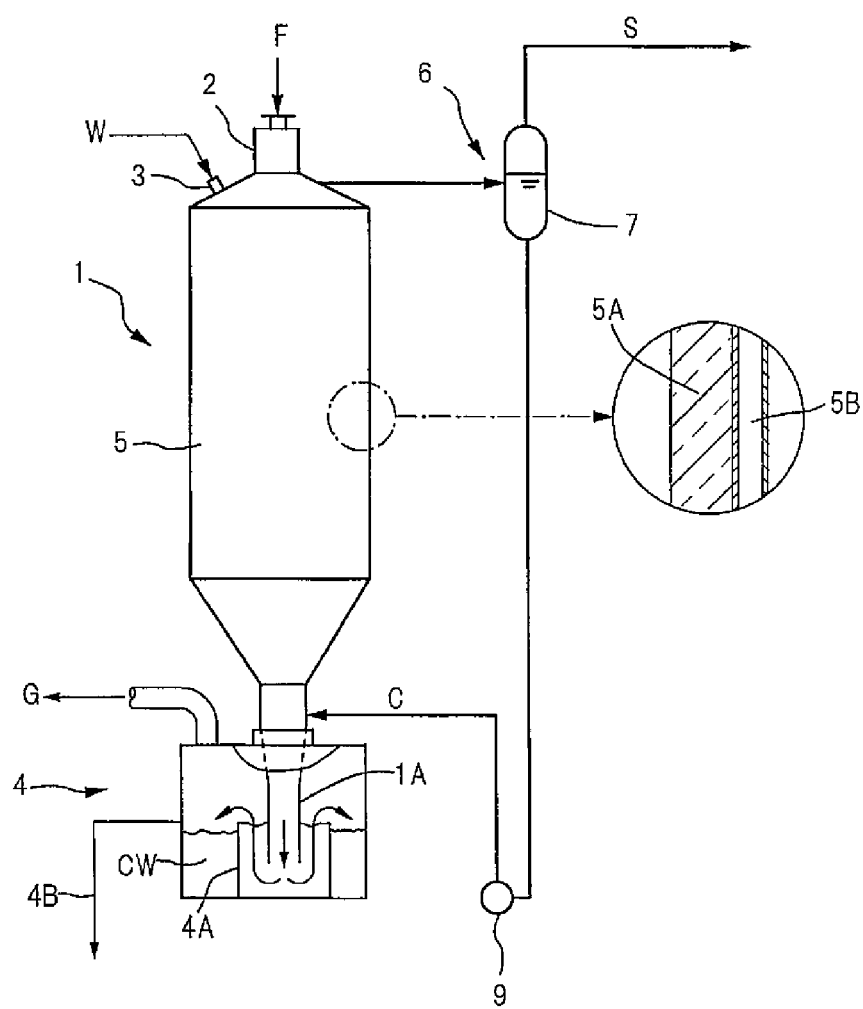
FIG. 3 is a view illustrating the basic configuration of the waste combustion system according to the present invention in third to fifth embodiments.
Figure 4:
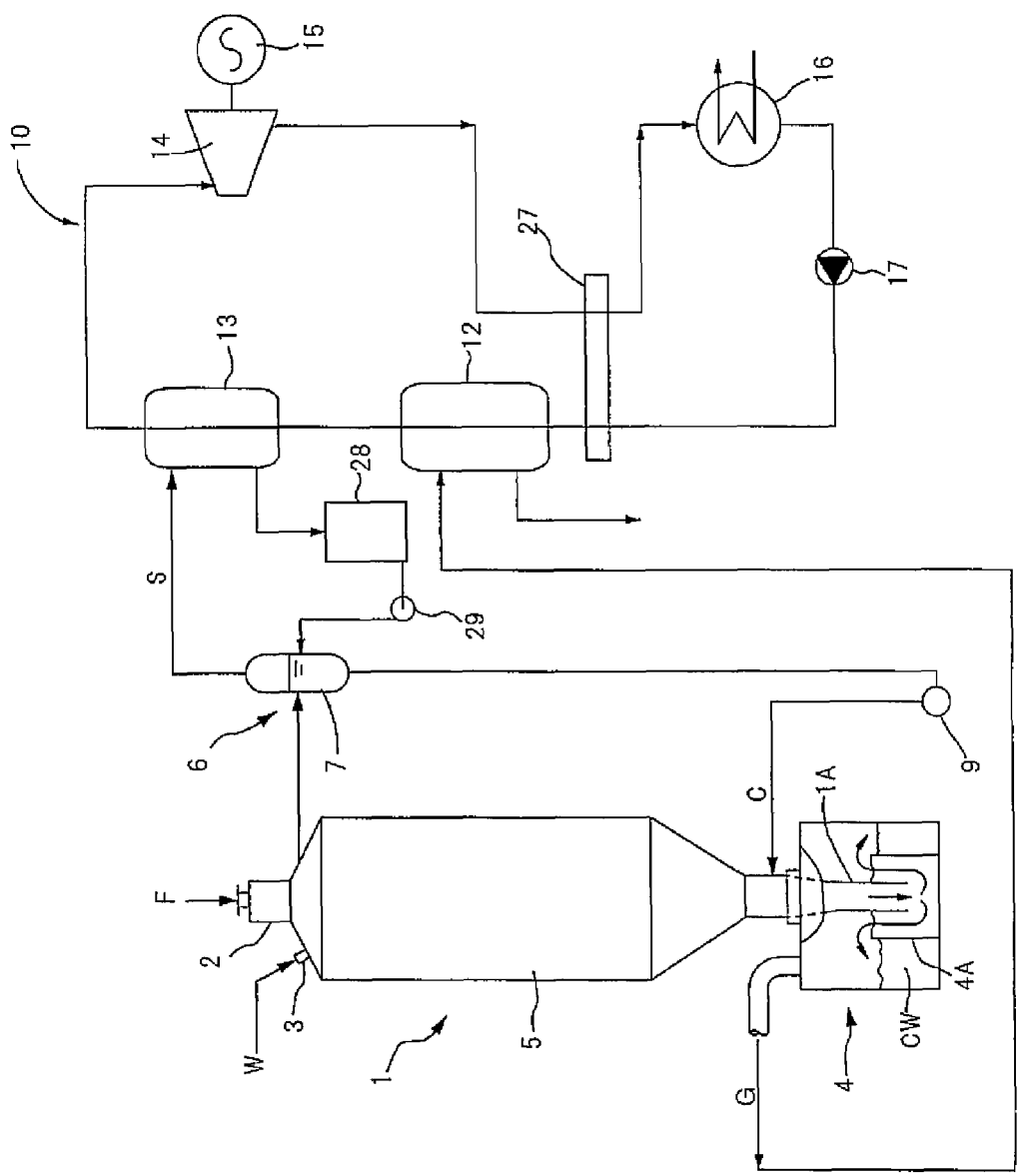
FIG. 4 is a view illustrating a third embodiment.

FIG. 3 is a view illustrating a basic configuration of a combustion system in the third to fifth embodiments. FIG. 4 is a view illustrating the third embodiment. A cooling water C, i.e., water is, after cooled by cooling means 6 installed outside the combustion furnace 1, is supplied into a space 5B formed in the internal wall region of the combustion furnace 1 so that the cooling water can be circulated between the combustion furnace and the cooling means 6. The cooling means 6 has a head tank 7, which is installed at a higher level than a liquid surface level of the cooling water C supplied to the jacket of the external wall 5 so as to hold the cooling water C circulating to and from the combustion furnace 1, and a pump 9 by means of which, the cooling water C discharged from the head tank 7 is supplied to the combustion furnace 1. The cooling water C held in the head tank 7 is fed by means of the pump 9 into the space 5B in a jacket structure of the external wall 5 of the combustion furnace 1. Then, the cooling water C cools the refractory in an internal wall region 5A and the cooling water C itself is heated due to this cooling and fed back to the head tank 7 so as to circulate between them.

In the present embodiment, as stated above, the cooling water C is, after cooling the refractory in the internal wall region 5A, fed back from the combustion furnace 1 while heated due to this cooling so as to generate a steam S, which will be used as a heat source of a heating device 13.

In a waste combustion system configured above for a waste W and a waste combustion method by using this system, the cooling water C is fed into the external wall 5 of the combustion furnace 1 where the waste W is supplied for combustion thereof so that the combustion furnace 1 is cooled. Therefore, corrosion of the refractory in the internal wall region is prevented and additionally, thus the heated cooling water C due to this cooling for the combustion furnace 1 is recovered in the form of the steam S from the head tank 7 by means of the recovery means 9.

The steam S generated from the cooling water C, which is recovered from the head tank 7, is a watery vapor having high coefficient of heat transfer because of a state of gas. Accordingly, heat exchange efficiency can be improved when the watery vapor is used as the heat source of the heating device 13. That is to say, in the waste combustion system configured above and the waste combustion method, energy generated by the combustion of the waste W in the combustion furnace 1 can be utilized more efficiently, which contributes to reduction of $CO_2$ generation.

Although the steam S generated from the cooling water C is used as the heat source of the heating device 13 in the present embodiment, it is also possible to use a heat transfer medium such as dibenzyl toluene or a polymeric oil as the heat source of the heating device 13, as described in JP 3394085.

In the present invention, for example as shown in FIG. 4, a circulating system employing a working medium is installed so as to extend through a vaporizer 12, a heating device 13 in a preferable case, an expansion turbine 14 and a generator 15, a condenser 16, and a booster pump 17 in that order.

In addition, a heat exchanger 27 is installed between an intermediate between the expansion turbine 14 and the condenser 16 and an intermediate between the booster pump 17 and the vaporizer 12.

The wet gas G caused by the direct contact between the combustion exhaust gas and the cooling/dissolving water CW is used as a heat source for the vaporizer 12. The vapor, after heating, can be used for another application or the like.

On the other hand, the heat transfer medium is circulated inside the external wall of the combustion furnace to enable to protect the wall of the combustion furnace so that a heat of the heat transfer medium after circulation is used as a heat source for the heating device 13.

In the fourth embodiment, the heat transfer medium, the heated waste steam S separated in the head tank 7 is used as the heat source for the heating device 13. The steam, after heating, is recovered to a tank 28 and fed back to the head tank 7 by means of a pump 29.

A working medium is heated in the vaporizer 12 and the heating device 13 and fed as a high temperature vapor into the expansion turbine 14 for operation of the generator 15. An exhaust gas from the expansion turbine 14 is condensed in the condenser 16 and fed by means of the booster pump 17 into the vaporizer 12. Before being condensed, the exhaust gas from the expansion turbine 14 is brought into heat exchange by a heat exchanger 27 whereby the temperature of the exhaust gas is decreased resulting in improving efficiency of the expansion turbine 14.

The pressure in the vaporizer 12 and/or the pressure in the heating device 13 can be adjusted with pressure adjusting means according to the required operation temperature.

Fourth Embodiment According to Claim 4

In the fourth embodiment, a multi-component cooling medium commonly used as an absorbent/refrigerant for an absorption heat pump is used favorably as a working medium such as water-ammonia or R134a (trinitrofluoroethanol).

In the present embodiment, for example as shown in FIG. 45, a first circulating system employing a working medium is installed so as to extends through a vaporizer 12, favorably a heating device 13 and a separation unit 51, an expansion turbine 14 and a generator 15, a condenser 16 and a booster pump 17 in that order.

A second circulating system is installed so as to combine a low-concentration working medium separated in the separation unit 51 and a turbine exhaust gas at a confluent point 24 between the expansion turbine 14 and the condenser 16, and a heat exchanger 27 is installed between the second circulating system and an intermediate between the booster pump 17 and the vaporizer 12.

With the exception of the above, the fourth embodiment has the same configuration as that of the third embodiment.

The wet gas G caused by direct contact between the combustion exhaust gas and the cooling/dissolving water CW is used as the heat source for the vaporizer 12. The heated vapor may be used, for example, for other application.

On the other hand, a heat transfer medium is circulated inside an external wall of the combustion furnace to enable to protect a wall of the combustion furnace so that a heat of the heat transfer medium after circulation is used as a heat source for the heating device 13.

In the fourth embodiment, the working medium is heated by the vaporizer 12 and the heating device 13, and the high temperature vapor is fed through the separation unit 51 into the expansion turbine 14, for operation of the generator 15. The exhaust gas from the expansion turbine 14 is condensed and converted into a medium fluid in the condenser 16.

On the other hand, the dilute low-concentration medium fluid separated in the separation unit 51 is heat exchanged in the heat exchanger 27 and combined with the exhaust gas from the expansion turbine 14 at the confluent point 24, for reduction of the back pressure of the expansion turbine 14 and increase of the efficiency of the expansion turbine 14.

The medium fluid condensed in the condenser 16 is fed via return line by the booster pump 17 into the vaporizer 12.

Figure 5:
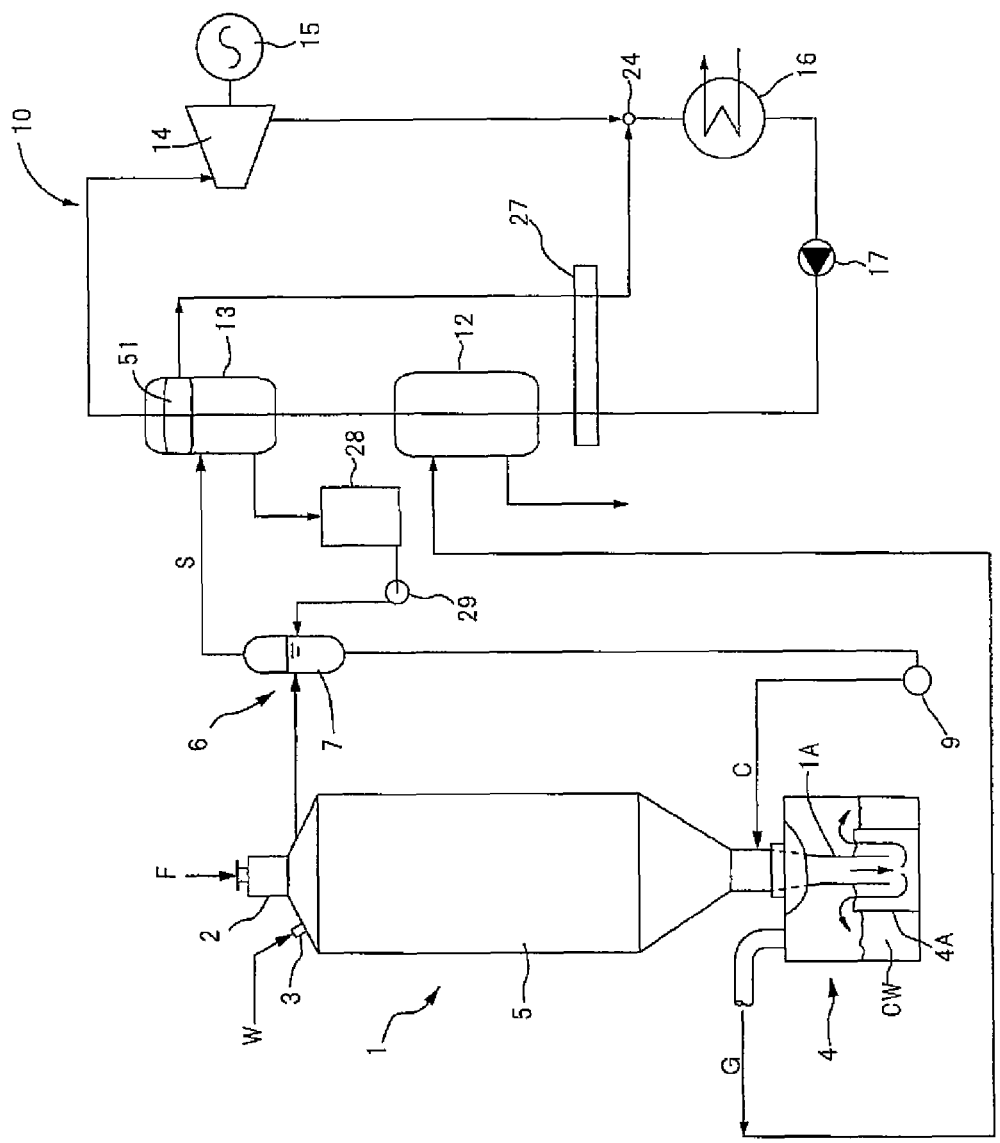
FIG. 5 is a view illustrating a fourth embodiment.

In the present embodiment, as shown in FIG. 5, a heating device region and a separation unit region are incorporated in a single shell as the heating device 13. Instead it is also possible that the separation unit 51 may be separately provided from the heating device. That is to say, the heating device 12 and the separation unit 51 are unified in a single apparatus, alternatively, the heating device 12 and the separation unit 51 are provided in a mechanically separated manner. The invention according to Claim 4 includes both the cases.

Fifth Embodiment According to Claim 6

Figure 6:
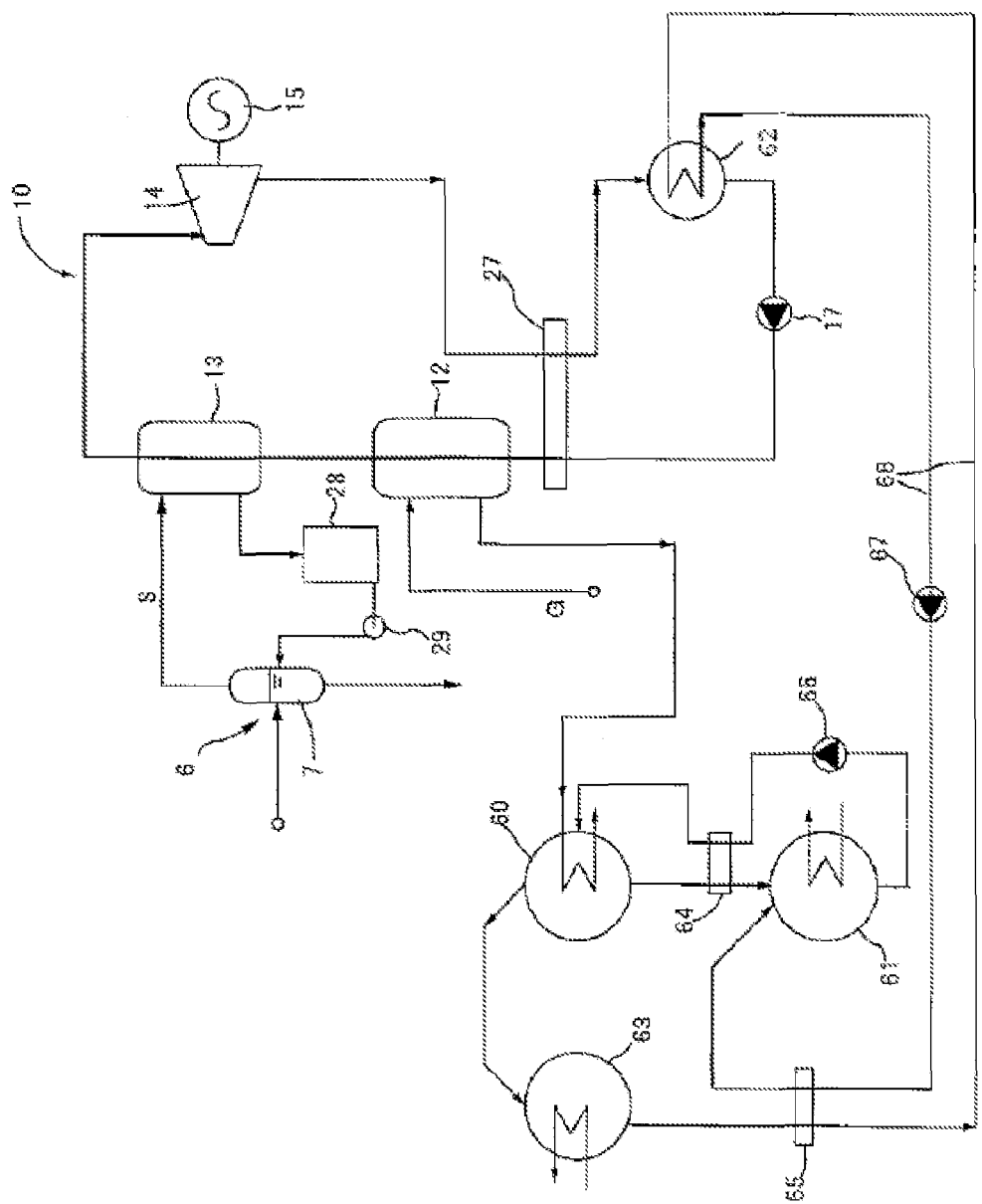
FIG. 6 is a view illustrating a fifth embodiment.
Figure 7:
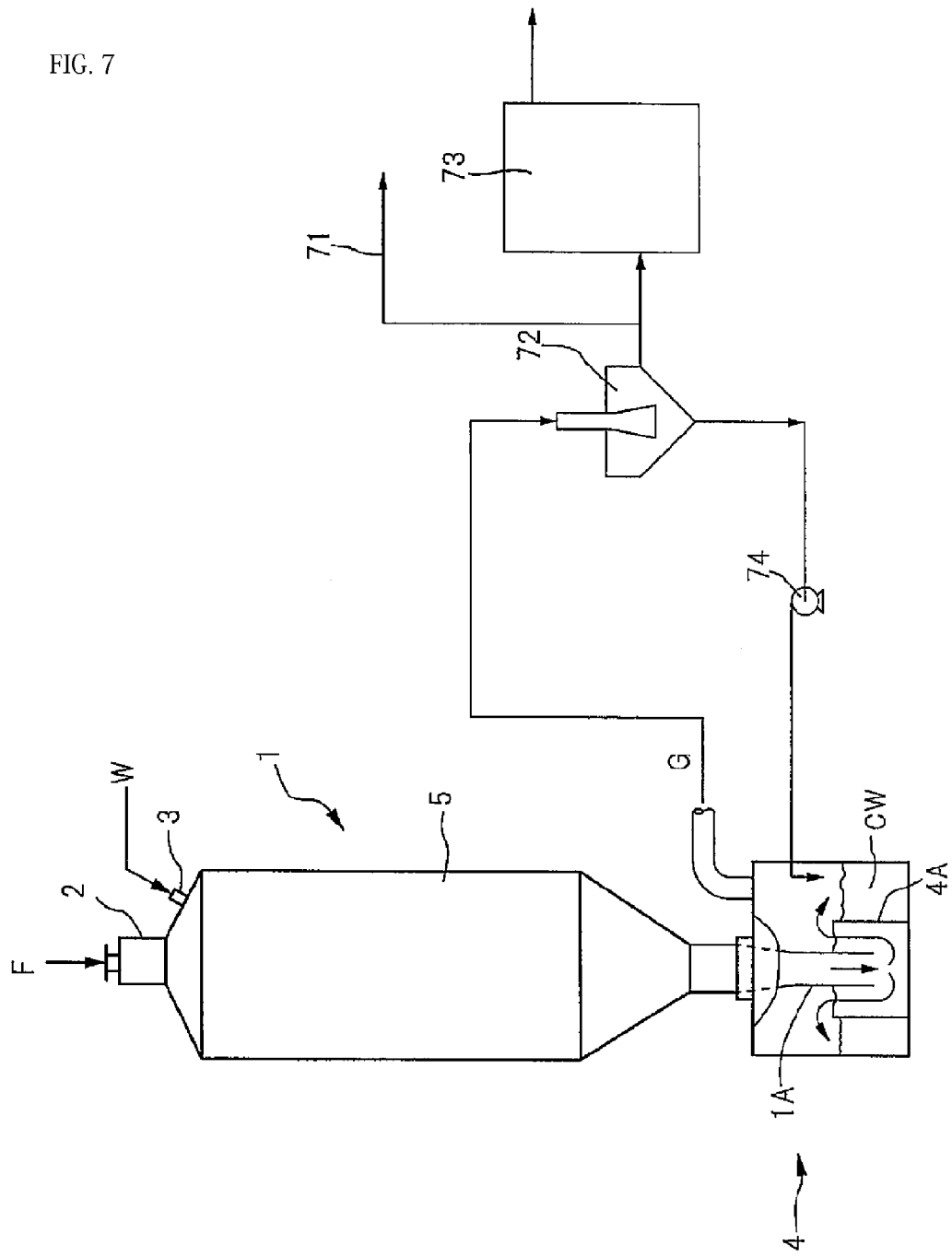
FIG. 7 is a view illustrating an embodiment of pretreatment for the wet gas.
Figure 8:
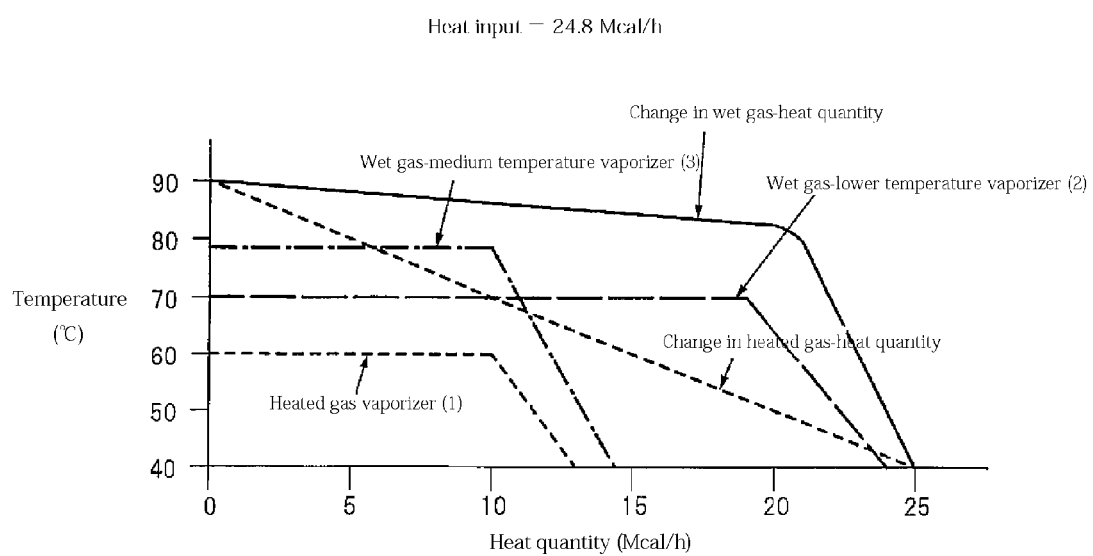
FIG. 8 is a graph showing the change in heat quantity with change in temperature.

The wet gas is lower in temperature, but higher in volume when it is produced. Thus, the wet gas still retains heat, even after it is used for heating in the vaporizer 12. Accordingly, the wet gas can be used further for another heat source by means of an absorption heat pump. Such application as another mode of the fifth embodiment will be shown in FIG. 6.

Specifically, the wet gas discharged from the vaporizer 12 is fed to a generator (regenerator) 60 of an absorption heat pump having the generator 60, a condenser 63, and an absorber 61 so that the absorption heat pump is operated. In this embodiment, the vaporizer 62 of the absorption heat pump is functioned also as the condenser 16 of the circulating system employing the working medium. The vaporizer 62 of the absorption heat pump is applied to the condenser 16 of the circulating system employing the working medium.

The operation of the absorption type heat pump will be described below, although it would be obvious. The vapor generated in the generator 60 is fed into the condenser 63 and the condensate there is fed into the condenser 16. The vapor is obtained by vaporization in the condenser 16. Thus obtained vapor is fed to the absorber 61, directly or as it is compressed and pressurized by a mechanical compressor 67 not shown in the Figure.

A concentrated fluid-supplying line and a dilute solution-returning line are brought into heat exchange in a heat exchanger 64 by means of a circulation pump 66 installed between the absorber 61 and the generator 60. The condensate from the condenser 63 and vapor from condenser 16 are also heat exchanged in the heat exchanger 65.

Modified Embodiments of the Third to Fifth Embodiments

In each embodiment of the third to fifth embodiments, the wet gas G separated from the dissolving liquid is used directly as the heat source for the vaporizer 12. However if there is concern about corrosion of the vaporizer 12 and decrease of the heat transfer coefficient by the wet gas G, it is possible that the wet gas is dust-removed in a dust collector 72 such as a venturi scrubber and the thus purified wet gas goes through a line 71 so as to be used as the heat source for the vaporizer 12. Reference Numeral 73 designates as an apparatus for prevention of a white smoke, which is connected to a chimney (not shown in the Figure).

EXAMPLES

Example 1

It is an example of the embodiment shown in FIG. 1. A working medium used for the power generation system was R245fa. 6000 kg/h of a wastewater (calorific value: 4200 kJ/kg) from a styrene monomer production facility and 300 kg/h of an auxiliary oil (calorific value: 40000 kJ/kg) were fed together with 10300 $m^3$/h of an auxiliary air into a combustion furnace at an operational pressure of 0.125 MPa and combusted at approximately 950° C. A combustion exhaust gas was cooled rapidly, as it is fed through a dissolver 4. Then, the wet gas G was washed in a low pressure dust collector 21 at a gas-liquid rate of 10 and fed into a bottom of a two-stage counter-current heat recovery column 30. After the furnace wall was cooled, a system was operated in such a manner that temperatures, pressures and flow rates of fluids S1 to S11 were adjusted so as to be those shown in Table 1. As a result, a power of 295 kW was generated at a generating end of a generator 15. It was confirmed that a thermal efficiency, which was calculated by comparison of a heat inputted into a preheater 11 and a vaporizer 12 with a power generated at the generating end, was sufficiently high of 7.3%.

TABLE 1

| | Liquid No. | | | | | | |
|---|---|---|---|---|---|---|---|
| | S1 | S2 | S3 | S4 | S5 | S6 | S7 |
| Liquid name | Combustion exhaust gas | Combustion exhaust gas | High-temperature water | High-temperature water | High-temperature water | Low-temperature water | Low-temperature water |
| Physical state | Air | Air | Liquid | Liquid | Liquid | Liquid | Liquid |
| Temperature [° C.] | 89.0 | 77.0 | 86.2 | 86.2 | 81.3 | 81.1 | 69.1 |
| Pressure [kPa] | 112 | 109 | 355 | 355 | 255 | 354 | 254 |
| Flow rate [Kg/h] | 23,341 | 17,106 | 6,000,000 | 4,730 | 6,000,000 | 80,000 | 80,000 |

| | Liquid No. | | | |
|---|---|---|---|---|
| | S8 | S9 | S10 | S11 |
| Liquid name | R245fa | R245fa | R245fa | R245fa |
| Physical state | Air | Air | Liquid | Liquid |
| Temperature [° C.] | 80.2 | 55.2 | 40.2 | 76.0 |
| Pressure [kPa] | 800 | 244 | 850 | 800 |
| Flow rate [Kg/h] | 70,000 | 70,000 | 70,000 | 70,000 |

Example 2

It is an example of the embodiment shown in FIG. 4. A wastewater from a petrochemical factory, containing 2804 kg of organic matter having a calorific value of 15070 kJ/kg was supplied into a combustion furnace (decomposition furnace) at a flow rate of 11700 kg/hr; an auxiliary oil having a calorific value of 40600 kJ/kg was supplied at a flow rate of 1485 kg/hr; a resultant mixture was pyrolyzed at a temperature of approximately 950° C. and then quenched with water, to give a wet gas at a flow rate of 72190 kg/hr and a heated waste steam at 0.081 MPa and a flow rate of 4518 kg/hr. In this case, an entire heat inputted to the decomposition furnace was 28370 kWth. A temperature of an inlet to a vaporizer 12 was 90° C.; an exit temperatures was 78° C.; and a vaporization temperature of a heating device 13 was 95° C. A vapor at a pressure of 0.47 MPa and a flow rate of 172800 kg/hr was obtained, as a condensation temperature of a condenser was set to be 40° C. and a working medium; isopentane was vaporized with a heat recovered from both vaporizers so that an expansion turbine equipped with a generator was driven with the vapor.

As a result, it was found that a generate power at a generating-end output of 1504 kW could be obtained with a sending-end output of 1482 kW and a power of 22 kW required for circulation pumps. Power generation efficiency, based on a ratio of an exhaust heat to an input heat, was approximately 5.2%.

Comparative Example 1

A Wet Gas was Used as a Heat Source for the Vaporizer 12 in the Embodiment shown in FIG. 4

It is an example similar to the embodiment shown in FIG. 4 with an exception that the heating device 13 is not used in this example. A power generated was a generating-end output of 1370 kW and a sending-end output of 1348 kW. The power generated in this case was approximately 89%, compared to that in Example 1.

Comparative Example 2

A Heated Waste Steam was Used as a Heat Source for the Heating Device 13 in the Embodiment shown in FIG. 4

It is an example similar to the embodiment shown in FIG. 4 with an exception that the vaporizer 12 shown in FIG. 4 is not used. A power generated was a generating-end output of 195 kW and a sending-end output of 173 kW. The power generated in this case was approximately 13%, compared to that in Example 1.

Example 3

It is an example of the embodiment shown in FIG. 5. A working medium used was aqueous ammonia. The other operational conditions were substantially identical with those in Example 1. However, a temperature of a wet gas at an inlet of a vaporizer 12 was 90° C.; an exit temperature was 76° C.; and a temperature of a heated waste steam at an inlet of a heating device 13 was 95° C. and an exit temperature was 95° C.

As a result, it was confirmed that a generate power at a generating-end output of 1580 kW could be obtained with a sending-end output of 1460 kW and a power of 120 kW required for operation of the power regeneration circulation pumps.

Comparative Example 3

A Wet Gas was Used as a Heat Source for the Heating Device 13 in the Embodiment shown in FIG. 5

A power generated in this case was approximately 89%, compared to that in Example 2.

Comparative Example 4

A Heated Waste Steam was Used as a Heat Source for the Vaporizer 12 in the Embodiment shown in FIG. 5

A power generated in this case was approximately 13%, compared to that in Example 2.

BRIEF DESCRIPTION OF NUMERALS

G . . . . Wet gas, 1 . . . Combustion furnace, 4 . . . Cooling/dissolving vessel (dissolver), 10 . . . Power generation system, 11 . . . Preheater, 12 . . . Vaporizer, 14 . . . Expansion turbine, 15 . . . Generator, 16 . . . Condenser, 21 . . . First dust-removing apparatus, 22 . . . Second dust-removing apparatus, 30 . . .

Counter-current heat recovery column, 31 ... Lower counter-current contact part, 32 ... Upper counter-current contact part

The invention claimed is:

1. A method of power generation by waste combustion comprising:
supplying the waste into a combustion furnace;
feeding a combustion gas from the combustion furnace into a quenching vessel containing a cooling/dissolving water; and
bringing the combustion exhaust gas into direct contact with the cooling/dissolving water, and thus generating a wet gas, wherein
the wet gas is supplied into a counter-current heat recovery column having a dust removing apparatus venturi scrubber, an inlet of the wet gas at its lower level, and an inlet for a heat recovery medium to be heated at its upper level so that the wet gas and the heat recovery medium are brought into contact under counter-current flow; and
the heat recovery medium heated in the counter-current heat recovery column is supplied to a power generation system employing a working medium so that the power generation system is operated.

2. The method of power generation by waste combustion according to claim 1, wherein dusts in the wet gas are removed at between the combustion furnace and the counter-current heat recovery column.

3. A system of power generation by waste combustion, comprising
a combustion furnace for combustion of a waste;
a quenching vessel/dissolver feeding combustion gas from the combustion furnace into the quenching vessel/dissolver containing a cooling/dissolving liquid, bringing the combustion gas and the cooling/dissolving liquid into direct contact with each other, and thus generating a wet gas;
a counter-current heat recovery column having an inlet of the wet gas at its lower level and an inlet for a heat recovery medium at its upper level so that the wet gas and the heat recovery medium are brought into contact under counter-current flow;
a dust removing apparatus venturi scrubber installed downstream from the counter-current heat recovery; and
a power generation system employing a working medium wherein the heat recovery medium heated in the counter-current heat recovery column is supplied to the power generation system for operation thereof.

4. The system of power generation by waste combustion according to claim 3, further comprising wet gas dust-removing means installed between the combustion furnace and the counter-current heat recovery column.

5. The system of power generation by waste combustion according to claim 3, wherein
the counter-current heat recovery column has upper and lower counter-current contact parts in two stages;
the power generation system has a preheater for the working medium, a vaporizer, an expansion unit equipped with a generator and a condenser,
a lower temperature heat recovery medium obtained in the upper counter-current contact part is circulated back to the preheater in a circulating system, and
a higher temperature heat recovery medium obtained in the lower counter-current contact part is circulated to the vaporizer in the circulating system.

6. The system of power generation by waste combustion according to claim 1, wherein
the combustion furnace has a cooling channel for flow of a cooling liquid in the furnace wall, and
the heat recovery medium, which has been produced by heating in the counter-current heat recovery column as the cooling liquid flows in the cooling channel, is supplied to a heating device installed downstream of the vaporizer for the working medium employed in the power generation system.

* * * * *